United States Patent
Geiser et al.

(10) Patent No.: US 10,935,085 B2
(45) Date of Patent: Mar. 2, 2021

(54) SWITCHABLE ROLLER ONE-WAY CLUTCH

(71) Applicant: SCHAEFFLER TECHNOLOGIES AG & CO. KG, Herzogenaurach (DE)

(72) Inventors: Jordan Geiser, Dalton, OH (US); Michael Hodge, Creston, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 225 days.

(21) Appl. No.: 15/978,327

(22) Filed: May 14, 2018

(65) Prior Publication Data
US 2019/0345994 A1 Nov. 14, 2019

(51) Int. Cl.
| F16D 41/066 | (2006.01) |
| F16D 27/112 | (2006.01) |
| F16D 41/08 | (2006.01) |
| F16D 47/04 | (2006.01) |
| F16D 41/04 | (2006.01) |
| F16D 27/00 | (2006.01) |
| F16D 41/06 | (2006.01) |

(52) U.S. Cl.
CPC .......... *F16D 41/066* (2013.01); *F16D 27/112* (2013.01); *F16D 41/088* (2013.01); *F16D 47/04* (2013.01); *F16D 41/04* (2013.01); *F16D 2027/005* (2013.01); *F16D 2041/0605* (2013.01)

(58) Field of Classification Search
None
See application file for complete search history.

(56) References Cited

U.S. PATENT DOCUMENTS

| 4,095,922 A * | 6/1978 | Farr | .................. F04B 35/04 |
| | | | 417/313 |
| 4,169,360 A * | 10/1979 | Shimizu | ............ B60H 1/3222 |
| | | | 123/195 A |

(Continued)

FOREIGN PATENT DOCUMENTS

| WO | 2002040891 A3 | 5/2002 |
| WO | 2004031597 A1 | 4/2004 |

(Continued)

OTHER PUBLICATIONS

International Search Report and Written Opinion for International Application No. PCT/US2019/018175 dated Jun. 7, 2019.

*Primary Examiner* — Colby M Hansen
(74) *Attorney, Agent, or Firm* — Brooks Kushman P.C.

(57) ABSTRACT

A switchable one-way clutch is provided for selectively switching between operating as a one-way clutch and a bi-directional locking clutch. The clutch includes a housing, and an outer race and an inner race, which is fixed rotationally to the housing. The clutch also includes a roller cage assembly having a plurality of rollers contactable with the inner race and the outer race. A roller cage is configured to position and contain the plurality of rollers therein. The clutch also includes an annular drag plate contacting the inner race. The drag plate is rotationally fixed to the roller cage and is moveable in an axial direction relative to the roller cage. An electromagnet assembly is configured to magnetize in response to electric energy. Via selective magnetization to attract the drag plate axially, the clutch can switch between operating modes.

20 Claims, 3 Drawing Sheets

(56) References Cited

U.S. PATENT DOCUMENTS

| | | | |
|---|---|---|---|
| 5,971,123 A * | 10/1999 | Ochab | F16D 27/10 192/38 |
| 6,409,000 B1 * | 6/2002 | Itoh | B60K 17/26 180/247 |
| RE38,012 E | 3/2003 | Ochab et al. | |
| 6,622,837 B2 | 9/2003 | Ochab et al. | |
| 6,629,590 B2 | 10/2003 | Ochab et al. | |
| 6,722,484 B2 | 4/2004 | Ochab et al. | |
| 8,840,514 B1 | 9/2014 | Knickerbocker et al. | |
| 8,857,294 B2 | 10/2014 | Brewer et al. | |
| 8,857,589 B2 | 10/2014 | Heath et al. | |
| 8,919,513 B2 | 12/2014 | Heath et al. | |
| 9,022,195 B2 | 5/2015 | Heath et al. | |
| 9,360,059 B2 | 6/2016 | Palmer et al. | |
| 2002/0125095 A1 | 9/2002 | Ochab et al. | |
| 2002/0125097 A1 | 9/2002 | Ochab et al. | |
| 2003/0089570 A1 | 5/2003 | Ochab et al. | |
| 2004/0110594 A1 | 6/2004 | Goto | |
| 2005/0236246 A1 | 10/2005 | Joki | |
| 2008/0128233 A1 | 6/2008 | Joki et al. | |
| 2010/0314213 A1 | 12/2010 | Joki | |
| 2012/0152686 A1 | 6/2012 | Brewer et al. | |
| 2013/0112520 A1 | 5/2013 | Heath et al. | |
| 2013/0134006 A1 | 5/2013 | Heath et al. | |
| 2013/0199886 A1 | 8/2013 | Heath et al. | |
| 2014/0274530 A1 | 9/2014 | Knickerbocker et al. | |
| 2015/0159707 A1 * | 6/2015 | Boelling | F02N 15/023 192/45.003 |
| 2015/0159743 A1 | 6/2015 | Palmer et al. | |
| 2016/0298703 A1 | 10/2016 | Williams | |
| 2017/0045099 A1 | 2/2017 | Peet | |
| 2018/0216676 A1 | 8/2018 | Geiser et al. | |

FOREIGN PATENT DOCUMENTS

| | | |
|---|---|---|
| WO | 2013082166 A1 | 6/2013 |
| WO | 2014143090 A1 | 9/2014 |
| WO | 2014159651 A1 | 10/2014 |

* cited by examiner

SWITCHABLE ROLLER ONE-WAY CLUTCH

TECHNICAL FIELD

The present disclosure relates generally to one-way clutches, and more specifically to switchable one-way clutches.

BACKGROUND

One-way clutches are known, particularly in vehicle transmission settings. One-way clutches enable torque to transmit in one rotational direction while inhibiting torque from transmitting in the other rotational direction by disengaging or freewheeling. Switchable one-way clutches are also known in which the clutch can selectively be locked in one direction, both directions, or neither direction. One example of a switchable one-way clutch is disclosed in U.S. Patent Application Publication No. 2017/0045099.

SUMMARY

According to one embodiment, a switchable one-way clutch includes a housing, and an outer race extending about and axis and having an inner surface. The switchable one-way clutch also includes an inner race extending about the axis and having an outer surface, where the inner race is fixed relative to the housing. The switchable one-way clutch also includes a roller cage assembly extending about the axis and having a plurality of rollers contactable with the inner race and the outer race, and a roller cage configured to position and contain the plurality of rollers. The switchable one-way clutch also includes an annular drag plate extending about the axis and contacting the outer surface of the inner race, where the drag plate is rotationally fixed to the roller cage and moveable in an axial direction relative to the roller cage. The switchable one-way clutch also includes an electromagnet assembly configured to magnetize in response to electric energy. The switchable one-way clutch is switchable between (i) a first mode in which the electromagnet assembly is energized, the drag plate is in a first axial position contacting the electromagnet assembly, and the drag plate and roller cage are rotationally fixed relative to the housing, and (ii) a second mode in which the electromagnet assembly is de-energized, the drag plate is in a second axial position axially spaced from the electromagnet assembly, and the drag plate and roller cage assembly are free to rotate about the axis relative to the housing.

According to another embodiment, a switchable one-way clutch includes a first race. The switchable one-way clutch also includes a second race concentric with the first race. The switchable one-way clutch also includes a roller cage assembly having a plurality of rollers located radially between the first race and the second race. The switchable one-way clutch also includes an electromagnetic assembly configured to magnetize in response to electric energy. The switchable one-way clutch also includes a drag plate rotationally fixed to the roller cage assembly, where the drag plate is configured to move in an axial direction relative to the roller cage assembly in response to magnetizing of the electromagnetic assembly.

In yet another embodiment, a switchable one-way clutch includes an outer race having an outer surface, and an inner surface with a plurality of ramped surface features. The switchable one-way clutch also includes an inner race. The switchable one-way clutch also includes a roller cage assembly having a plurality of rollers disposed radially between the inner race and the ramped surface features of the outer race to selectively enable torque to transmit when rotating in a first rotational direction and not transmit when rotating in a second rotational direction. The switchable one-way clutch also includes an annular drag plate constrained to rotate with the roller cage in both rotational directions, where an activation of an electromagnet force moves the drag plate in a first axial direction to rotationally lock the roller cage assembly to inhibit movement of the outer race, and removal of the electromagnet force allows the drag plate to move in a second axial direction to rotationally unlock the roller cage assembly to enable rotational movement of the outer race.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In various embodiments described below, a switchable roller one way clutch is disclosed. The switchable roller one way clutch is also referred to interchangeably herein as a selectable roller one-way clutch, a bi-directional roller one-way clutch, switchable one-way clutch, or simply as 'one-way clutch', 'OWC', or 'clutch'. In an example embodiment, the switchable one-way clutch includes an electromagnet assembly that moves a drag plate to vary the switchable one-way clutch between two states: (1) the 'neutral' or 'unlocked' state wherein the clutch is locked in one direction (e.g., clockwise) and free in the opposite direction (e.g., counter-clockwise); and (2) the 'active' or 'locked' state wherein the clutch is locked in one direction (e.g., clockwise) and also locked in the opposite direction (e.g., counter-clockwise).

Figure 1:
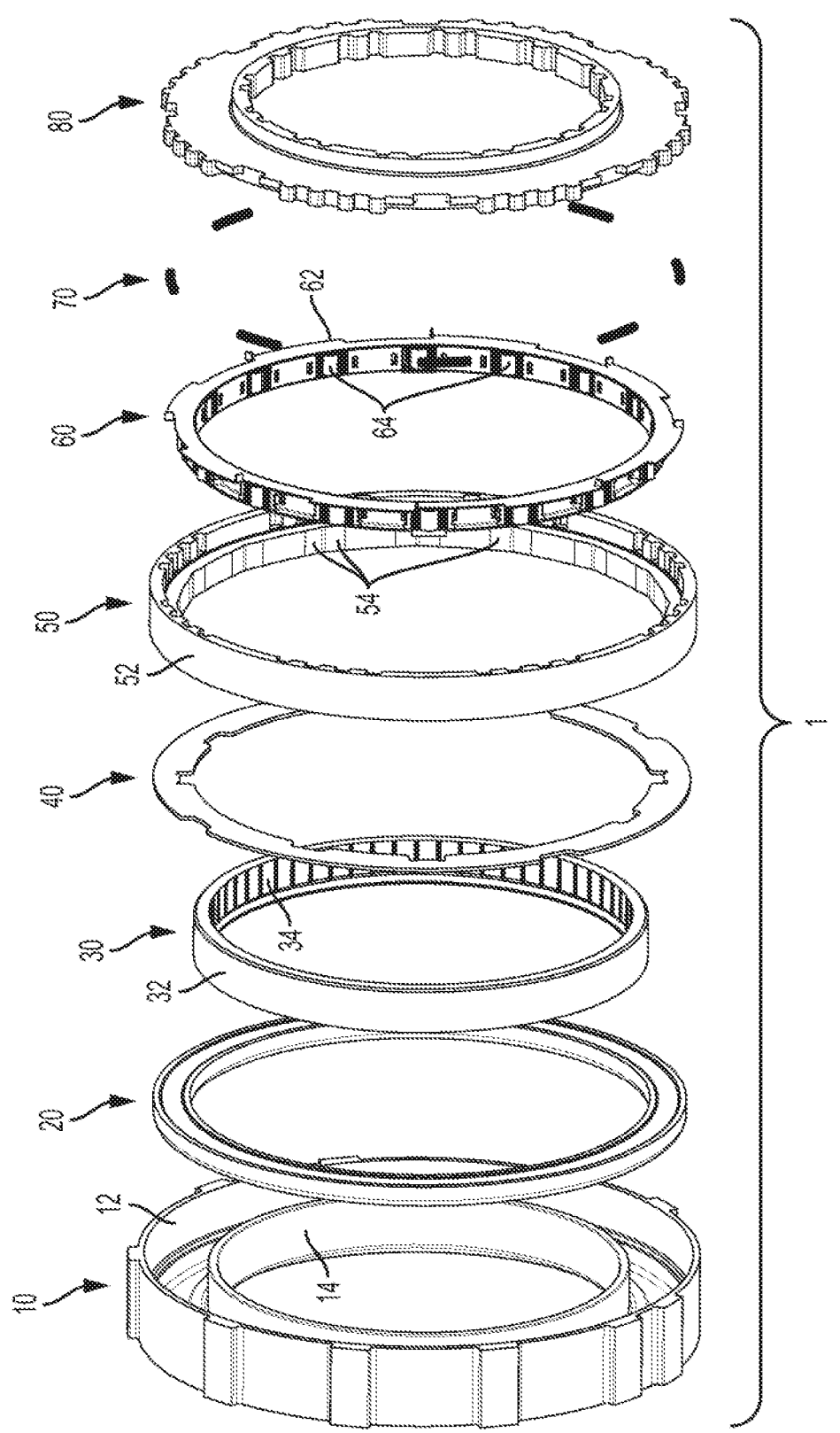
FIG. 1 is an exploded perspective view of a switchable one-way clutch, according to one embodiment.
Figure 2:
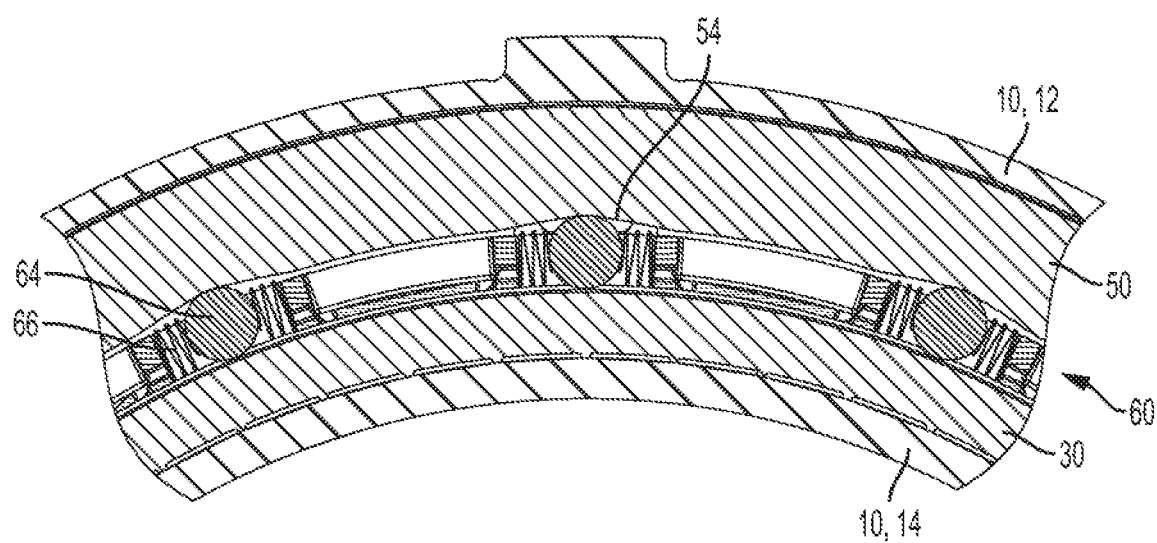
FIG. 2 is a front cross-sectional view of a portion of an assembled switchable one-way clutch, according to one embodiment.
Figure 3A:
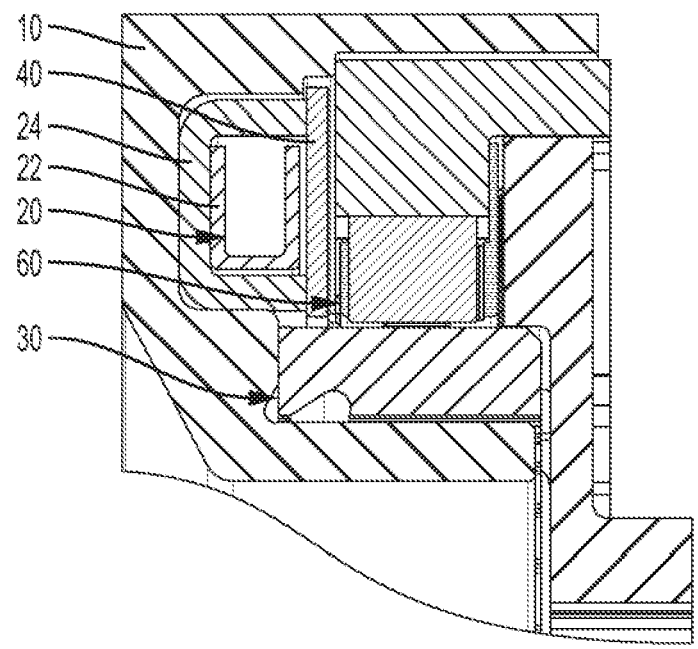
FIG. 3A is a side cross-sectional view of a portion of the assembled switchable one-way clutch, according to one embodiment.
Figure 3B:
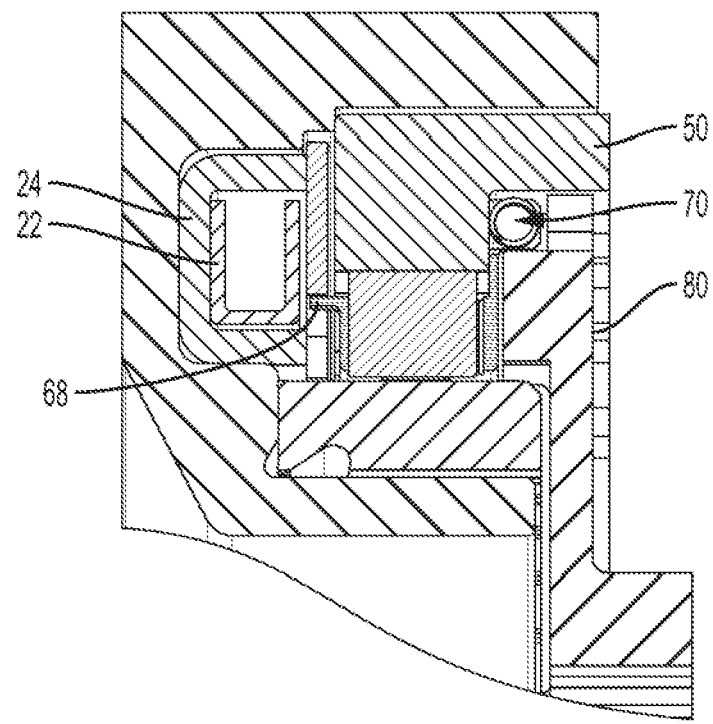
FIG. 3B is a side cross-sectional view of another portion of the assembled switchable one-way clutch, according to one embodiment.

Reference will not be made to the Figures in which FIG. 1 shows an exploded perspective view of a disassembled switchable one-way clutch 1. FIG. 2 shows a front cross-sectional view of a portion of an assembled switchable one-way clutch 1, and FIGS. 3A-3B show two side cross-sectional views taken from different locations of the assembled switchable one-way clutch 1. As will be described below, in the locked mode, energizing one or more electromagnets or electromagnet assemblies 20 causes a drag plate 40 to move axially, which frictionally holds a roller cage assembly 60 in place. An outer ring 50 can then only move a small amount in either direction until it contacts the rollers 64 of the roller cage assembly 60, pinching the rollers 64 against the inner ring 30, thereby locking the clutch 1 in both directions.

The switchable one-way clutch 1 includes the following components that will be described in more detail below: a housing 10, an electromagnet assembly 20, an inner ring 30, a drag plate 40, an outer ring 50, a roller cage assembly 60, bias springs 70, and a cover plate 80.

The housing 10 can be locked in place or fixedly installed onto a transmission housing of a vehicle. The housing 10 has a first annular region 12 and a second annular region 14 that collectively receive the remaining illustrated components radially therebetween. In the illustrated embodiment, the first annular region 12 and the second annular region 14 are formed from a single component; however, in other embodiments the regions 12, 14 are two separate components fixed to one another and to the transmission housing.

The outer ring (also referred to as an outer race) 50 is the driving, rotating component for the switchable one-way clutch 1. The outer ring 50 has an outer surface 52 that is generally cylindrical and in a slideable engagement with the housing 10, and an opposing inner surface that has a plurality of ramped surface features or ramped surfaces 54. The ramped surfaces 54 are collectively valley shaped in that they make up a plurality of valleys and peaks. The inner ring (also referred to as an inner race) 30 has an outer surface 32 that is generally cylindrical, and an opposing inner surface 34 facing radially inward and locked or otherwise fixed to the housing 10.

In its default mode or position, the clutch 1 acts as a one-way clutch, locking in one rotational direction wherein rollers travel up the ramped surfaces and pinch or wedge between the inner ring 30 and outer ring 50, and freewheeling in the other rotational direction. More specifically, according to various embodiments, the clutch 1 is able to act as a one-way clutch due to the roller cage assembly 60 having a roller cage 62 and a plurality of rollers (also referred to as rolling elements) 64 contained by the roller cage 62. The roller cage 62 is provided to position and locate the rollers 64. That is, the roller cage 62 includes pockets for locating the rollers 64 so that they are spaced apart in a circumferential direction and can be rotated together relative to the inner ring 30 and outer ring 50 while also rotating in their respective pockets relative to the cage 62. The roller cage assembly 60 may also include springs 66 with one on either side of a respective roller 64 to bias and aid in positioning the rollers in their respective pockets. The rollers 64 contact the inner ring 30 as well as the ramped surfaces 54 of the outer ring 50. When the clutch 1 is activated to be in its locked mode via the electromagnet assembly 20 that will be described below, the outer ring 50 can only rotate a small amount (e.g., between one and five degrees) in either direction until the rollers 64 pinch or lock the outer ring 50 to the inner ring 30 by traveling up the ramped surfaces 54.

A drag plate 40 (also referred to as a control plate) can be provided to selectively lock and unlock the clutch 1 to switch between operating modes (i.e., unlocked/OWC mode and locked mode). In one embodiment, the drag plate 40 is axially offset from the roller cage assembly 60, except for axially-extending protrusions or tabs 68 extending axially from the roller cage 62. The tabs 68 can be located within pockets or grooves of the drag plate 40 such that the drag plate 40 and the roller cage assembly 60 are rotationally fixed. In another embodiment, the rotationally fixed engagement between the drag plate 40 and the roller cage 62 is accomplished via tabs extending from the drag plate 40 that extend into corresponding grooves of the roller cage 62. The drag plate 40 can also slide axially relative to the roller cage assembly 60.

To move the drag plate 40 axially, an electromagnet assembly 20 is provided. The electromagnet assembly 20 can include a magnet core 24 having a U-shaped cross-sectional profile with open ends or poles facing one axial direction (e.g., to the right in FIGS. 3A-3B). Within the magnet core 24 is a bobbin 22 with a U-shaped cross-sectional profile with open ends facing radially outward in this example. This provides a circumferential groove or housing to contain windings, for example (not shown). The electromagnet assembly 20 can be pressed or slip-fit into the housing 10 to connect thereto via an interference fit. The electromagnet assembly 20 can be electrically activated via an external power source (not shown) which energizes the magnet core and defines magnetic poles. When energized, the electromagnet assembly 20 attracts the drag plate 40, pulling the drag plate 40 axially toward the electromagnet assembly 20 (i.e., to the left in FIGS. 3A-3B) until it makes contact and locks in place due to friction. That is, when the electromagnet assembly 20 is energized, the electromagnet assembly 20 causes the drag plate 40 to move axially and become rotationally fixed with the electromagnet assembly 20 and housing 10. For example, once energized, a friction force between the poles or ends of the core 24 and an axial face of the drag plate 40 holes Since the drag plate 40 is rotatably fixed to the roller cage 62, the energization of the electromagnet assembly 20 also rotationally fixes the roller cage 62 relative to the housing 10. This converts the clutch 1 into its "locked" state, in which the outer ring 50 is only able to rotate minimally in either direction due to the rollers 64 being wedged and contained between the ramped surfaces 54 and the inner ring 30.

When the electromagnet assembly 20 is de-energized, the drag plate 40 can slide axially away from the electromagnet assembly 20 (i.e., to the right in FIGS. 3A-3B). This allows the drag plate 40 and connected roller cage assembly 60 rotate relative to the housing 10, and the clutch 1 to operate in its one-way clutch mode. Springs 70 can be provided about the roller cage assembly 60 to bias the clutch 1 into the OWC mode when the electromagnet assembly 20 is de-energized. In particular, the springs 70 can contact the roller cage 62 and the cover plate 80 (or the outer ring itself or any other component fixed with the outer ring) to bias the roller cage assembly 60 in one rotational direction.

According to an embodiment, the cover plate 80 is connected to an input to the clutch (not shown), and has outer teeth that engage with corresponding notches in the outer ring 50. Therefore, rotation of the cover plate 80 drives the outer ring 50 for operation of the clutch 1.

In short, the present disclosure provides a switchable clutch with an electromagnet assembly for actuating and switching the clutch. Electrical energizing of the electromagnet assembly causes a drag plate to move axially toward the magnet, which causes the drag plate to be held against rotation relative to the housing. The drag plate is rotationally fixed to a roller cage, and so holding the drag plate against rotation also holds the roller cage against rotation. The outer ring is therefore also constrained such that the outer ring can only rotate a few degrees until the rollers have rolled up the ramped surfaces of the outer ring. The outer ring is therefore constrained by the rollers of the roller cage assembly when rotated in either direction, allowing the clutch assembly to act as a clutch locking in two directions. To unlock the clutch, the electromagnet is de-energized, allowing the drag plate to move out of engagement with the magnet and therefore allow the drag plate, the roller cage, and the outer ring to rotate together in one direction Another alternative embodiment (not illustrated) is contemplated in which the inner ring includes the ramped surfaces 54 instead of the outer ring. In such an embodiment, the roller cage assembly may be rotatably connected to the inner ring rather than the outer ring. The outer ring would have a cylindrical inner profile, and the ramped surfaces would be on the inner ring. And, the electromagnetic assembly would force the drag plate into engagement to rotatably fix the outer ring and the roller cage assembly to lock the clutch.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is not limited to only the illustrated embodiments.
1 switchable one-way clutch (clutch)
10 housing
12 first annular region
14 second annular region
20 electromagnet assembly
22 bobbin
24 magnet core
30 inner ring
32 outer surface
34 inner surface
40 drag plate
50 outer ring
52 outer surface
54 ramped surfaces
60 roller cage assembly
62 roller cage
64 rollers
66 springs
68 tabs
70 bias springs
80 cover plate

What is claimed is:

1. A switchable one-way clutch comprising:
a housing;
an outer race extending about an axis and having an inner surface;
an inner race extending about the axis and having an outer surface, wherein the inner race is fixed relative to the housing;
a roller cage assembly extending about the axis and having
a plurality of rollers contactable with the inner race and the outer race, and
a roller cage configured to position and contain the plurality of rollers;
an annular drag plate extending about the axis and contacting the outer surface of the inner race, wherein the drag plate is rotationally fixed to the roller cage and moveable in an axial direction relative to the roller cage; and
an electromagnet assembly configured to magnetize in response to electric energy;
wherein the switchable one-way clutch is switchable between
a first mode in which the electromagnet assembly is energized, the drag plate is in a first axial position contacting the electromagnet assembly, and the drag plate and roller cage are rotationally fixed relative to the housing, and
a second mode in which the electromagnet assembly is de-energized, the drag plate is in a second axial position axially spaced from the electromagnet assembly, and the drag plate and roller cage assembly are free to rotate about the axis relative to the housing.

2. The switchable one-way clutch of claim 1, wherein in the first mode the inner race and outer race are locked in a first rotational direction and free to rotate relative to one another in a second rotational direction.

3. The switchable one-way clutch of claim 2, wherein in the second mode the inner race and outer race are locked in the first rotational direction and in the second rotational direction.

4. The switchable one-way clutch of claim 1, wherein the inner surface of the outer race defines a plurality of ramped surface features, wherein, in the first mode, the outer race is constrained to rotate via the rollers rolling along the ramped surface features.

5. The switchable one-way clutch of claim 1, wherein the electromagnet assembly is fixed to the housing via an interference fit.

6. The switchable one-way clutch of claim 1, wherein the electromagnet assembly includes a magnetized region that directly contacts the drag plate in the first mode.

7. A switchable one-way clutch comprising:
a first race;
a second race concentric with the first race;
a roller cage assembly having a plurality of rollers located radially between the first race and the second race;
an electromagnetic assembly configured to magnetize in response to electric energy; and a drag plate rotationally fixed to the roller cage assembly, wherein the drag plate is configured to move in an axial direction relative to the roller cage assembly in response to magnetizing of the electromagnetic assembly.

8. The switchable one-way clutch of claim 7, wherein the drag plate is configured to move axially between
   a first axial position in which the switchable one-way clutch operates in a locked mode in which the first race and the second race are constrained to rotate together in a first rotational direction and a second rotational direction, and
   a second axial position in which the switchable one-way clutch operates in a one-way clutch mode in which the first race can rotate relative to the second race in the first rotational direction and the first race is constrained to rotate with the second race in the second rotational direction.

9. The switchable one-way clutch of claim 7, wherein the drag plate is configured to move axially between a first position in which the drag plate contacts the electromagnet assembly and a second position in which the drag plate is axially spaced from the electromagnet assembly.

10. The switchable one-way clutch of claim 9, further comprising a housing, wherein the drag plate and the roller cage assembly are rotatably fixed to the housing when the drag plate is in the first position.

11. The switchable one-way clutch of claim 9, wherein the first race includes a plurality of ramped surface features contacting the rollers.

12. The switchable one-way clutch of claim 11, wherein rotation of the first race forces the roller cage assembly to rotate until the rollers travel along the ramped surfaces and force the second race to rotate with the first race.

13. The switchable one-way clutch of claim 7, wherein the drag plate is constrained to rotate between one and five degrees relative to the roller cage assembly.

14. The switchable one-way clutch of claim 7, wherein the electromagnet assembly includes an annular bobbin with a U-shaped cross-sectional profile containing a magnet core configured to define magnetic poles in response to the electric energy.

15. A switchable one-way clutch comprising:
   an outer race including an outer surface, and an inner surface with a plurality of ramped surface features;
   an inner race;
   a roller cage assembly having a plurality of rollers disposed radially between the inner race and the ramped surface features of the outer race to selectively enable torque to transmit when rotating in a first rotational direction and not transmit when rotating in a second rotational direction;
   an annular drag plate constrained to rotate with the roller cage in both rotational directions, wherein an activation of an electromagnet force moves the drag plate in a first axial direction to rotationally lock the roller cage assembly to inhibit movement of the outer race, and removal of the electromagnet force allows the drag plate to move in a second axial direction to rotationally unlock the roller cage assembly to enable rotational movement of the outer race; and
   an electromagnet assembly configured to selectively supply the electromagnet force to move the drag plate in the first direction, electromagnet assembly including a magnet core having ends that directly contact the drag plate when the electromagnet assembly supplies the electromagnet force.

16. The switchable one-way clutch of claim 15, further comprising a housing having an inner surface contacting the outer surface of the outer race, wherein the electromagnet assembly is secured within the housing.

17. The switchable one-way clutch of claim 15, wherein the roller cage assembly includes a roller cage with an axially-extending protrusion, and wherein the drag plate is configured to slide axially along the axially-extending protrusion while constrained to rotate with the annular drag plate.

18. The switchable one-way clutch of claim 15, wherein the roller cage assembly includes a plurality of rollers between the inner race and the ramped surface features of the outer race, wherein a rotational force placed on the roller cage assembly when the drag plate is forced in the second axial direction forces the rollers along the ramped surfaces to transmit torque between the inner race and outer race only in a first rotational direction.

19. The switchable one-way clutch of claim 18, wherein a rotational force placed on the roller cage assembly when the drag plate is forced in the first axial direction forces the rollers along the ramped surfaces to transmit torque between the inner race and the outer race in both the first rotational direction and in a second rotational direction.

20. The switchable one-way clutch of claim 15, wherein the magnet core is U-shaped, and wherein the electromagnet assembly includes an annular bobbin with a U-shaped cross-sectional profile within the magnet core and configured to contain windings therein.

* * * * *